(12) United States Patent
Biebricher et al.

(10) Patent No.: US 11,346,333 B2
(45) Date of Patent: May 31, 2022

(54) SEPARATION DEVICE AND OIL SEPARATING AIR FILTER ASSEMBLY COMPRISING SUCH SEPARATION DEVICE AS WELL AS METHOD FOR SEPARATING FLUID FROM A GAS STREAM DERIVING FROM A CONNECTING DEVICE

(71) Applicant: MANN+HUMMEL GmbH, Ludwigsburg (DE)

(72) Inventors: Peter Biebricher, Mannheim (DE); Bertram Bartelt, Steinheim (DE); Klemens Dworatzek, Edingen (DE); Fei Wang, Shanghai (CN); Sascha Roth, Schwegenheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 229 days.

(21) Appl. No.: 16/740,706

(22) Filed: Jan. 13, 2020

(65) Prior Publication Data

US 2020/0224649 A1 Jul. 16, 2020

Related U.S. Application Data

(63) Continuation of application No. PCT/CN2017/092808, filed on Jul. 13, 2017.

(51) Int. Cl.
*F04B 39/16* (2006.01)
*B01D 46/00* (2022.01)
(Continued)

(52) U.S. Cl.
CPC .......... *F04B 39/16* (2013.01); *B01D 46/0031* (2013.01); *B01D 46/2411* (2013.01);
(Continued)

(58) Field of Classification Search
CPC .............. B01D 46/003; B01D 46/0031; B01D 46/0023; B01D 46/0024; B01D 46/2411;
(Continued)

(56) References Cited

U.S. PATENT DOCUMENTS 4,692,175 A 9/1987 Frantz
4,878,929 A 11/1989 Tofsland et al.
(Continued)

FOREIGN PATENT DOCUMENTS

CN 206234123 U 6/2017
DE 202008005672 U1 9/2009
(Continued)

*Primary Examiner* — Robert Clemente

(57) ABSTRACT

A separation device for separating fluid from a gas stream has a housing with housing corpus and housing cover non-detachably connected to the housing corpus. A hollow cylindrical filter insert is received in the housing in a flow path of the gas stream from a raw gas inlet to a clean gas outlet. The filter insert has first and second end discs at first and second axial end face sides. The filter insert has a main separator element with hollow cylindrical coalescing filter medium with coalescer material for removing fluid from the gas stream that is flowing radially through the main separator element. A preliminary separator element having a coalescing filter medium with coalescer material is arranged in the flow path of the gas stream between the raw gas inlet and the filter insert for removing fluid from the gas stream.

21 Claims, 4 Drawing Sheets

(51) Int. Cl.
   *B01D 46/24* (2006.01)
   *B01D 46/62* (2022.01)

(52) U.S. Cl.
   CPC ........ *B01D 46/62* (2022.01); *B01D 2257/702* (2013.01); *B01D 2265/029* (2013.01); *B01D 2265/06* (2013.01); *B01D 2267/00* (2013.01)

(58) Field of Classification Search
   CPC .......... B01D 46/2414; B01D 2257/702; B01D 2265/029; B01D 2265/06; B01D 2267/00; F04B 39/16
   See application file for complete search history.

(56) References Cited

U.S. PATENT DOCUMENTS

| | | |
|---|---|---|
| 2006/0123743 A1 | 6/2006 | Heer |
| 2016/0030870 A1 | 2/2016 | Schmelzle et al. |

FOREIGN PATENT DOCUMENTS

| | | |
|---|---|---|
| DE | 102011108061 A1 | 1/2013 |
| EP | 0814891 B1 | 1/1998 |
| EP | 2105184 B1 | 9/2009 |
| EP | 2471588 B1 | 7/2012 |
| GB | 1238843 A | 7/1971 |

SEPARATION DEVICE AND OIL SEPARATING AIR FILTER ASSEMBLY COMPRISING SUCH SEPARATION DEVICE AS WELL AS METHOD FOR SEPARATING FLUID FROM A GAS STREAM DERIVING FROM A CONNECTING DEVICE

CROSS-REFERENCE TO RELATED APPLICATIONS

This application is a continuation application of international application No. PCT/CN2017/092808 having an international filing date of 13 Jul. 2017 and designating the United States, the entire contents of the aforesaid international application being incorporated herein by reference.

TECHNICAL FIELD

The present invention relates to a separation device, in particular to a spin-on filter, for separating fluid, in particular oil, from a gas stream, in particular from an air stream, for example, from a compressed air stream, deriving from a connecting device, in particular from a compressor, of a compressed air system or of a vacuum pump.

BACKGROUND OF THE INVENTION

Prior art document EP 0 814 891 B1 discloses an air de-oiling separator comprising an interchangeable filter insert with a prefiltering web. The interchangeable filter insert comprises a flange for arranging the interchangeable filter in a pressure vessel. In EP 0 814 891 B1, the filter insert by itself is a replaceable unit. Said filter insert is designed for being replaceably received in a housing.

In case of spin-on separation devices, as a rule the filter housing cannot be opened, i. e., the housing cover is non-detachably connected to the housing. Thus, the spin-on filter as a whole forms a replaceable unit. The design of a spin-on filter is therefore also referred to as a replacement filter.

A separation device, in particular a spin-on filter, of the aforementioned kind is disclosed in prior art document DE 10 2011 10 80 61 A1. The preliminary separator element of the separation device differs from the separation device of the present invention in that the prior art preliminary separator element acts by changing the gas flow direction due to the preliminary separator element geometry, e. g. blade geometry. According to DE 10 2011 10 80 61 A1, the preliminary separation occurs by inertia of the fluid due to the redirection of the gas flow. The preliminary separator element disclosed in DE 10 2011 10 80 61 A1 is voluminous and expensive in production.

SUMMARY OF THE INVENTION

The present invention relates to a separation device, in particular to a spin-on filter, for separating fluid, in particular oil, from a gas stream, in particular from an air stream, for example, from a compressed air stream, deriving from a connecting device, in particular from a compressor, of a compressed air system or of a vacuum pump.

The separation device comprises a housing being designed to be replaceably connected with the connecting device, in particular to be spinned on the connecting device. A hollow cylindrical filter insert is received in the housing in the flow path of the gas stream between at least one raw gas inlet and at least one clean gas outlet. The raw gas inlet is designed for supplying raw gas or for supplying gas to be separated from fluid. The clean gas outlet is designed for exhausting clean gas or for exhausting separated gas. The raw gas inlet and the clean gas outlet are advantageously arranged at the housing cover.

An axis, in particular an assembly axis for assembling the separation device to the connection device, extends longitudinally through the housing corpus and defines an axial direction. The housing comprises a cup-shaped housing corpus and a housing cover for covering a first axial end of the housing corpus. The housing cover is non-detachably connected to the housing corpus, i.e. the housing cover is connected to the housing corpus in such way, that the housing cover cannot be disconnected from the housing corpus without destroying the housing corpus and/or the housing cover.

The filter insert comprises at least one first end disc and at least one second end disc disposed on opposite axial end face sides of the filter insert, wherein the first end disc faces the housing cover and the second end disc faces away from the housing cover. Moreover, the filter insert comprises at least one main separator element comprising at least one coalescing filter medium comprising at least one coalescer material for removing fluid, in particular oil, from the gas stream.

In the flow path of the gas stream between the raw gas inlet and the first end disc of the filter insert, in particular between the housing cover and the first end disc, at least one preliminary separator element is arranged.

The present invention further relates to an oil separating air filter assembly comprising at least one separation device of the aforementioned kind and at least one connecting part, in particular at least one connection nipple or connection tube or threaded pipe stub, being designed for connecting the separation device with a connector head of the connecting device, wherein the connecting part is arranged within the clean gas outlet of the separation device. The connecting part comprises at least one connecting element, in particular at least one threaded pipe stub, for connecting the separation device with the connector head and comprises at least one clean gas conducting element, in particular at least one nipple or tube, comprising at least one gas-conducting inner space for conducting separated clean gas from the clean side of the separation device to the connector head of the connecting device.

The present invention also relates to a method for separating fluid, in particular oil, from a gas stream, in particular from an air stream, for example, from a compressed air stream, deriving from a connecting device, in particular of a compressor, of a compressed air system or of a vacuum pump, (i) wherein the gas stream to be separated from fluid is flowing into a housing of a separation device through at least one raw gas inlet of the housing, the housing being replaceable connectable with a connector head of the connecting device, (ii) wherein in the housing the gas stream is flowing through at least one preliminary separator element being arranged in the flow path of the gas stream between the raw gas inlet and at least one main separator element, (iii) wherein, after passing through the preliminary separator element, the gas stream is flowing radially through the main separator element, the main separator element being arranged in the housing in the flow path of the gas stream between the preliminary separator element and at least one clean gas outlet out of the housing, wherein the main separator element is acting as a coalescer for removing fluid, in particular oil, from the gas stream and separates the housing into a raw side and a clean side.

Starting from the disadvantages and shortcomings as described earlier and taking the prior art as discussed into account, an object of the present invention is to further develop a separation device of the kind as described in the technical field, an oil separating air filter assembly of the kind as described in the technical field, and a method of the kind as described in the technical field in such way that a preliminary separation of the gas stream having streamed into the housing by the raw gas inlet is provided with low costs and low volume. In particular, it is an object of the present invention to further develop a separation device of the kind as described in the technical field such that the separation device is designed in a compact manner and is inexpensive and easy to manufacture.

The object of the present invention is achieved in that the separation device of the aforementioned kind is characterized in that, according to the invention. the preliminary separator element comprises at least one coalescing filter medium, comprising at least one coalescer material for removing fluid, in particular oil, from the gas stream.

The object of the present invention is further achieved in that the oil separating air filter assembly of the aforementioned kind is characterized in that, according to the invention, it comprises a separation device in accordance with the invention.

The object of the present invention is further achieved in that the method of the aforementioned kind is characterized in that, according to the invention, the preliminary separator element is acting as a coalescer for removing fluid, in particular oil, from the gas stream.

Advantageous embodiments and expedient improvements of the present invention are disclosed in the respective dependent claims.

The present invention is principally based on the idea of providing a separation device of the kind as described in the technical field with at least one preliminary separator element comprising at least one coalescing filter medium, in particular at least one preliminary filter mat. Thus, the preliminary separator element according to the present invention acts as a coalescer.

The preliminary separator element comprising at least one coalescing filter medium enables that the amount of fluid arriving at the main separator element is reduced or at least exists in a more usable form, e.g. that the fluid comprises larger drops and/or that the gas stream comprising the fluid to be separated flows through the main separator element with a preferably more uniform flow distribution. This leads to the advantage that the separation device according to the invention has an increased degree of separation.

The preliminary separator element is advantageously allocated to the area between the housing cover and the filter insert, in particular the first end disc. For example, the preliminary separator element can be a ring-shaped mat of fiber being arranged on the housing cover.

The preliminary separator element and the main separator element are arranged in succession in direction of the flow path of the gas stream. In order to design the separation device in a very compact manner, the preliminary separator element and the main separator element are advantageously disposed in succession in the axial direction.

According to a preferred embodiment of the present invention the coalescing filter medium of the preliminary separator element is configured to be flowed through radially as well as axially, in particular from radially inward and axially downward to radially outward and axially upward, by the flow of the gas stream, the coalescing filter medium of the main separator element is configured to be flowed through radially, in particular from radially outward to radially inward, by the flow of the gas stream.

According to a preferred embodiment of the present invention, the preliminary separator element is substantially disc-shaped and comprises at least one central or coaxial pass-through opening. The coaxial pass-through opening is advantageously designed for passing through at least one coaxial connecting element for connecting the separation device with the connector head and at least one coaxial clean gas conducting element comprising at least one gas-conducting inner space for conducting separated clean gas from the separation device to the connector head of the connecting device.

Moreover, the coaxial pass-through opening can be designed for passing through at least one circumferential annular trough of the first end disc, wherein the first end disc is repeatedly bent in such way that the trough is provided and wherein the trough opens toward the element interior of the hollow cylindrical filter insert.

The coalescer material of the preliminary separator element is advantageously a fibrous nonwoven fabric. In other words, the coalescing filter medium advantageously essentially comprises nonwoven filter material, in particular nonwoven fabric, for example, fibrous nonwoven fabric, such as fibrous nonwoven fabric made of polyester.

According to a preferred embodiment of the present invention, the preliminary separator element has a smaller flow resistance than the coalescing filter medium of the main separator element. This can be achieved by using more layers of coalescer material for the main separator element than for the preliminary separator, preferably by using a single-layer or maximally two-layer preliminary separator element and a main separator element with at least double the number of layers. Preferably, the main separator element has at least five especially wound layers of coalescer material. This can also or additionally be achieved by choosing a coalescer material for the preliminary separator element that has a higher air permeability than the coalescer material of the main separator element.

Independently thereof or in combination therewith, according to a preferred embodiment of the present invention the coalescer material of the preliminary separator element has a smaller weight per unit area (grammage) and/or a higher fiber coarseness than the coalescing filter medium of the main separator element. For example, for the main separator element a coalescer material preferably comprising or being made of glass fiber can be used having a grammage of 150-400 grams per square meter, preferably between 170 and 275 grams per square meter. For example, for the preliminary separator element a coalescer material, preferably comprising or being made of nonwoven, especially made from polyester, can be used having a grammage of 30-130 grams per square meter, preferably between 50 and 100 grams per square meter.

For providing a high separation efficiency, the preliminary separator element has advantageously an axial material thickness of at least 2 millimeter, in particular of at least 2.5 millimeter. Advantageously, the preliminary separator element essentially extends in axial direction over the whole distance between the housing cover and the first end disc. Thus, the preliminary separator element advantageously fills essentially the whole axial area.

In radial direction the preliminary separator element advantageously extends from a radial outer lateral surface of the area between the raw gas inlet and the filter insert to a radial inner lateral surface of the area between the raw gas inlet and the filter insert. In other words, the preliminary separator element advantageously extends in radial direction essentially over the whole distance of the radial extension of the area between the housing cover and the filter insert. In particular, the preliminary separator element essentially extends in radial direction from the housing corpus to a radial inner surface of the area between the raw gas inlet and the filter insert, in particular the first end disc.

According to an advantageous embodiment of the present invention, the first end disc is approximately annular and has a coaxial pass-through opening being designed for passing through at least one connecting element for connecting the separation device with the connector head and at least one clean gas conducting element comprising at least one gas-conducting inner space for conducting separated clean gas from the separation device to the connector head of the connecting device.

Radially between the pass-through opening of the first end disc and the filter medium of the filter insert, the first end disc is repeatedly bent such that there is a circumferential annular trough, which opens toward the element interior of the filter insert. Said trough can serve as a clean side collecting area for collecting, under the influence of gravity, fluid being separated by the main separator element.

The preliminary separator element advantageously essentially extends in radial direction from the housing corpus to the annular trough of the first end disc.

According to a particularly inventive embodiment of the present invention, the preliminary separator element is arranged in the area between the raw gas inlet and the first end disc, in particular with tight compression, such that the preliminary separator element is held in position directly by its surrounding geometries of the area between the raw gas inlet and the filter insert.

In particular, the preliminary separator element is held in position directly by the housing cover, by the housing corpus, and by the first end disc. Fastening members are not required. A tight compression of the preliminary separator element is helpful for holding the preliminary separator element in position.

The coalescing filter medium is designed for separating the housing into a raw side comprising raw gas containing fluid and a clean side comprising clean gas having been cleaned from fluid. According to a particularly inventive embodiment of the present invention, the preliminary separator element is arranged in the separation device such that the fluid being separated by the preliminary separator element flows under the influence of gravity through an opening arranged at the raw side of the housing, in particular through the raw gas inlet, out of the separation device. This leads to the advantage that the fluid separated by the preliminary separator element can directly drop back into the original room where it derives from. The separated fluid can drain through the preliminary separator element, in particular through the mat of fibers or through the fibrous nonwoven fabric, and then flow via the opening arranged at the raw side of the housing, in particular through the raw gas inlet, back to the connector head. The fluid having drained from the separation device advantageously flows via the connector head to a fluid collector of the connecting device.

According to a preferred embodiment of the invention, the preliminary separator element covers the raw gas inlet. This leads to the advantage that the preliminary separator element is visible from the outside of the housing of the separation device.

According to a preferred embodiment of the present invention, the separation device comprises at least one further preliminary separator element, containing at least one coalescer material for removing fluid, in particular oil, from the gas stream, wherein the further preliminary separator element is arranged concentrically to the main separator element, and wherein the further preliminary separator element and the main separator element are arranged in succession in direction of the flow path of the gas stream. The further preliminary separator element is advantageously configured to be flowed through radially, in particular from radially outward to radially inward, by the gas stream or by the flow path.

The coalescer material of the further preliminary separator element can be, for example, essentially the same as the coalescer material of the preliminary separator element.

In order for the raw gas having streamed into the housing by the raw gas inlet to distribute essentially over the whole axial length of the housing inside and to stream into the further preliminary separator element at an area that is optimal for the flow path depending on decrease in pressure, according to an advantageous embodiment of the present invention, there is a gap between the radial wall of the housing corpus and the further preliminary separator element.

For the present invention, the main separator element is advantageously designed as a filter wrap, i.e. at least one filter medium, for example, a nonwoven filter material, which is wound a plurality of times about a ring-shaped support body, in particular about a perforated support tube. Thus, the filter insert of the main separator element comprises a ring-shaped support body. The coalescer material of the main separator element is advantageously a glass fiber material being wound in multiple layers around the ring-shaped support body.

The coalescer material of the preliminary separator element is advantageously much more open than the coalescer material of the main separator element. Preferably, the coalescer material of the preliminary separator element is advantageously much more open than the coalescer material of the main separator element such that air permeability of the coalescer material of the preliminary separator element is at least five times, preferably at least 10 times, most preferably at least 20 times higher than the air permeability of the coalescer material of the main separator element, at the same time preferably not more than 30 times higher. For example, a filter medium with air permeability between 100 and 200 $l/m^2s$ can be used, especially in form of a wound filter body with multiple wound layers, as a coalescer material of the main separator element. For example, a coalescer material of the preliminary separator element can be chosen with an air permeability between 1,000 and 4,000 $l/m^2s$, especially between 2,000 and 3,500 $l/m^2s$. The air permeability values given are measured at a pressure of 2 mbar (200 Pa).

The raw gas inlet is arranged at the raw side of the housing and the clean gas outlet is arranged at the clean side of the housing. According to an advantageous embodiment of the invention, the raw gas inlet and/or the clean gas outlet are arranged at the housing cover.

For connecting the separation device with the connecting device, the housing cover is advantageously designed to be replaceably mounted on a connecting part. In particular, the housing cover comprises a central hole being designed for passing through the connecting part. For example, the clean gas outlet can be a central threaded hole of the housing cover, wherein the threaded hole is designed to be screwed onto a threaded pipe stub firmly fixable on a connector head of the connecting device.

The oil droplets having been separated by the main separator coalescing element and the oil droplets having been separated by an optional secondary separator element flow downward following gravity and pass advantageously through at least one coaxial fluid outlet of the connecting part into at least one oil outlet channel of the connector head.

The present invention in particular relates to the use of at least one separation device as described above and/or of at least one oil separating air filter assembly as described above and/or of the method as described above for separating oil from a compressed air stream deriving from a compressor, from a compressed air system or from a vacuum pump.

BRIEF DESCRIPTION OF THE DRAWINGS

As already discussed above, there are several options to embody as well as to improve the teaching of the present invention in an advantageous manner. To this aim, reference is made to the claims. Further improvements, features and advantages of the present invention are explained below in more detail with reference to two preferred embodiments by way of example and to the accompanying drawings.

The same reference numerals are used for corresponding parts in FIG. 1 to FIG. 4.

DESCRIPTION OF PREFERRED EMBODIMENTS

In order to avoid unnecessary repetitions, the following description regarding the embodiments, characteristics and advantages of the present invention relates to (unless stated otherwise)
  the first embodiment of the oil separating air filter assembly according to the present invention (cf. FIGS. 1, 3) as well as
  the second embodiment of the oil separating air filter assembly according to the present invention (cf. FIG. 2) as well as
  the separation device 100 according to a first exemplary embodiment of the present invention (cf. FIGS. 1, 3) as well as
  the separation device 100' according to a second exemplary embodiment of the present invention (cf. FIG. 2),
all embodiments 100, 100' being operated according to the method of the present invention.

Figure 1:
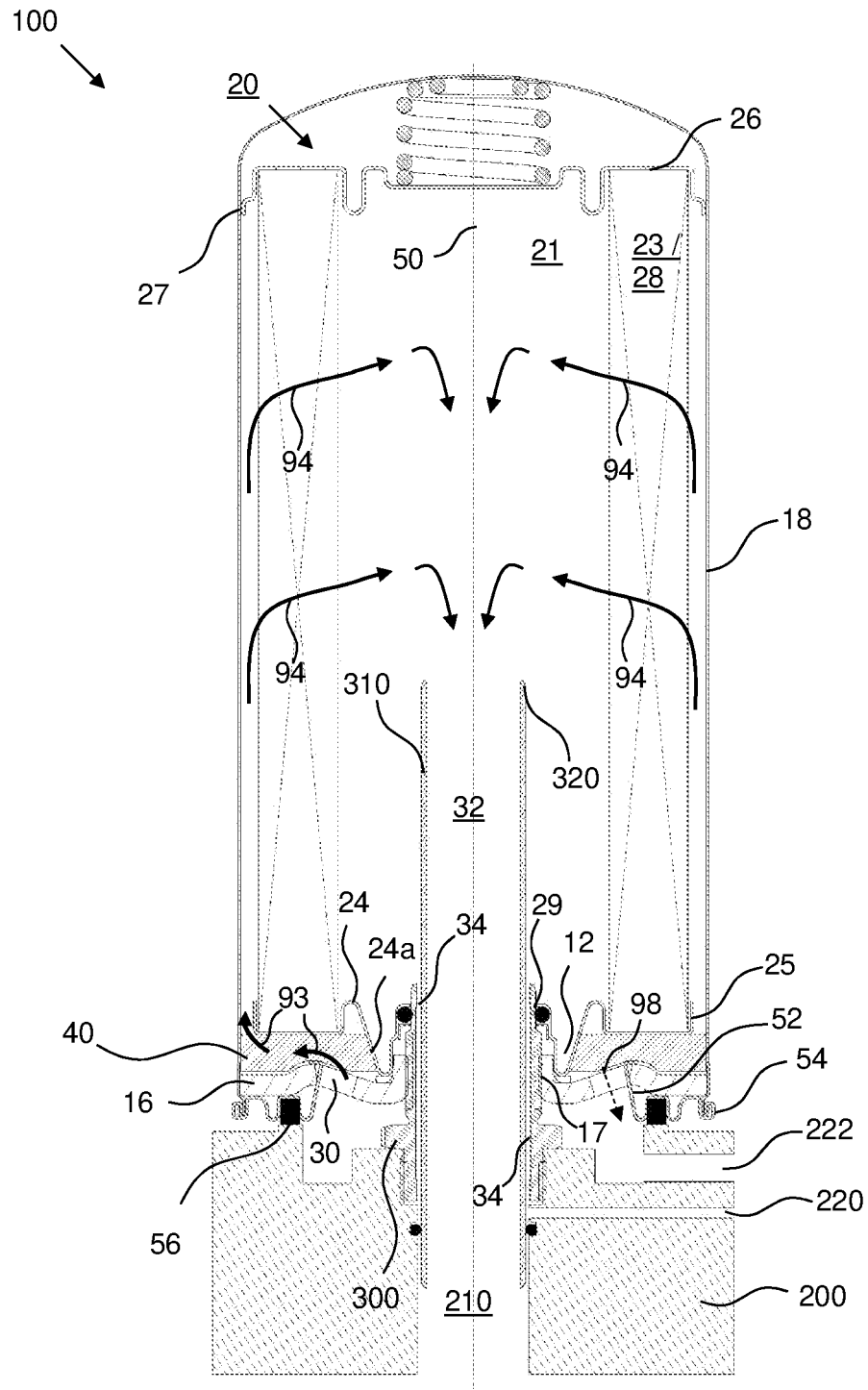
FIG. 1 shows a first exemplary embodiment of an oil separating air filter assembly comprising a separation device according to a first exemplary embodiment of the present invention, wherein the separation device is working according to the method of the present invention.

FIG. 1 shows a first embodiment of an oil separating air filter assembly according to the present invention, serving for the separation from the air of such oil as is carried with the air. The oil separating air filter assembly is used, for example, in compressors, vacuum pumps, compressed air systems or the like. It can be disposed before the inlet or after the outlet of a corresponding unit.

The oil separating air filter assembly depicted in FIG. 1 comprises a first embodiment of the separation device 100 according to the present invention, which can also be referred to as a spin-on air de-oiling box or an air/oil separator box. The spin-on air de-oiling box 100 is replaceably fixed on a connector head 200, at the bottom of FIG. 1. The connector head 200 serves as a connection element for corresponding air lines and oil lines for connecting with a corresponding connecting device, in particular with a compressor, with a compressed air system or with a vacuum pump.

A connecting part 300, 310, in particular a connection nipple or connection tube, for example, of a threaded pipe stub or threaded connection nipple or threaded connection tube, such as a hollow, pipe stub-like connection nipple 300, 310, connects the spin-on air de-oiling box 100 with the connector head 200. The connection nipple 300, 310 comprises
  a connecting element 300, in particular a threaded pipe stub, for connecting the separation device 100, 100' with the connector head 200 and
  a clean gas conducting element 310, in particular at least one nipple or tube, comprising at least one gas-conducting, in particular air-conducting, inner space.

The spin-on air de-oiling box 100 comprises a housing with a cup-shaped corpus 18 and a housing cover 16 for closing an opening of the housing corpus 18. The housing corpus 18 and the housing cover 16 are made, for example, of metal. Alternatively, at least one of the two components can be made from another material, for example, plastic, or at least have another material.

Figure 4:
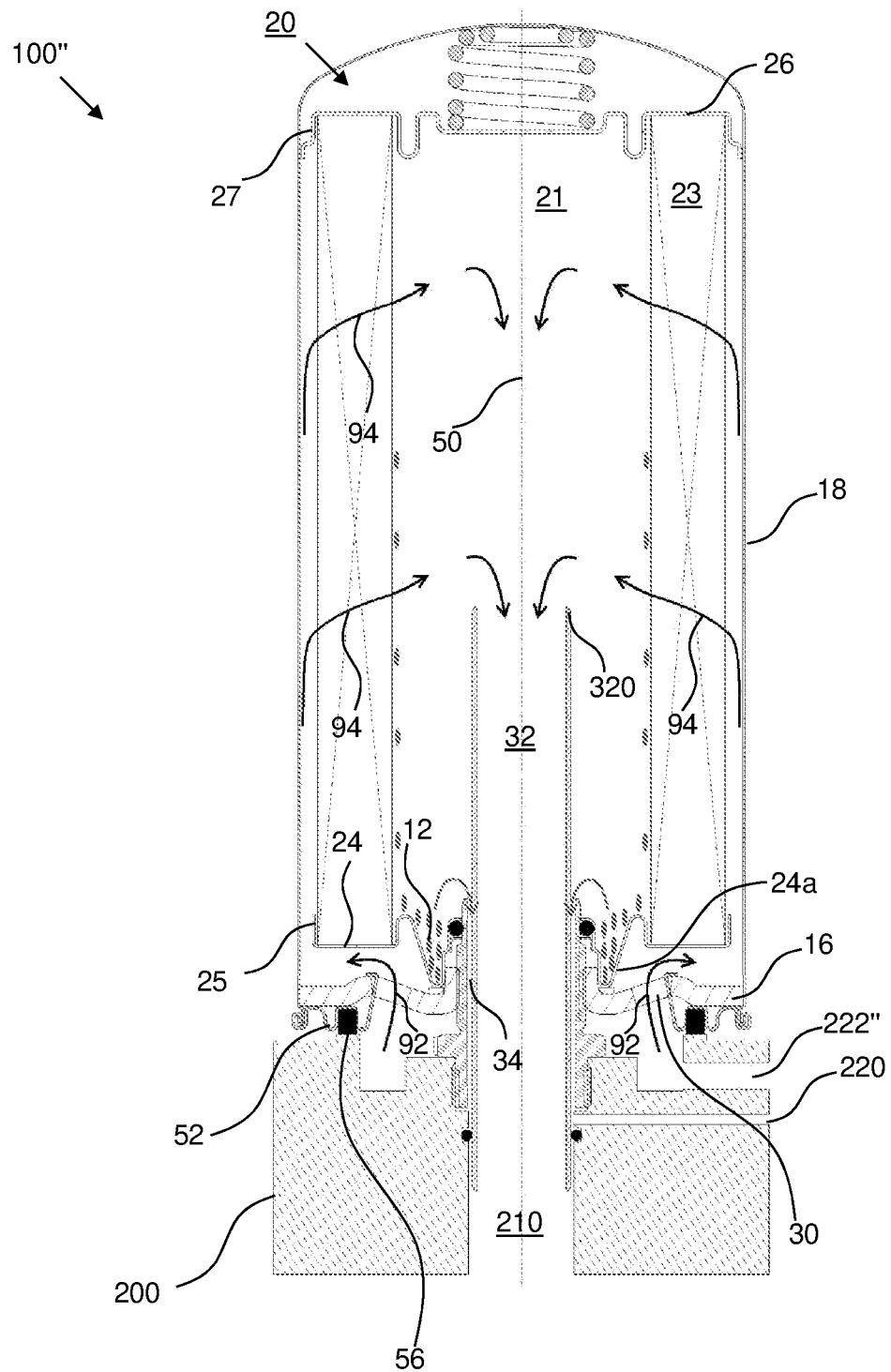
FIG. 4 shows an oil separating air filter assembly according to prior art.

A hollow cylindrical filter insert 20 is disposed in the housing 16, 18 in the flow path of the gas stream between at least one raw gas inlet 30 and at least one clean gas outlet 32. The filter insert 20 is configured to be flowed through radially by the gas stream as depicted in FIG. 4. The filter insert 20 comprises a main separator element comprising
  a coalescing filter medium 23 comprising at least one coalescer material for removing oil from the gas stream and
  at least one ring-shaped support body (not shown) for supporting the coalescing filter medium 23.

Thus, the main separator element is designed as a ring-shaped coalescing element. By way of example, the main separator element has as a filter medium a glass fiber mat 23, which is repeatedly annularly wrapped and bounded by a first end disc or by a lower end plate 24 facing the connector head 200 and a second end disc 26 or an upper end plate 26 facing away from the connector head 200.

As a secondary separator element 28, a further filter medium, for example, a non-woven material, can be disposed in the interior of the glass fiber wrap 23 of the main separator element of the filter insert 20.

In general, the spin-on air de-oiling box 100, 100', 100" is ready for use as disposed in the orientation shown in FIGS. 1 to 4. However, it can also be disposed in other orientations. When further reference is made to "below," "above," or the like, this refers, unless otherwise stated, to the representation in FIGS. 1, 2, 4.

In an operation-ready assembly, the housing corpus 18, the filter insert 20 and the connection nipple 300, 310 are respectively coaxial with an imaginary assembly axis 50. The spin-on air de-oiling box 100, 100', 100" can be screwed onto the connector head 200 and unscrewed therefrom about the assembly axis 50 by means of the connecting element 300 of the connection nipple 300, 310.

When in this document reference is made to "radial," "axial," "coaxial" or "circumferential" or the like, this refers, unless otherwise stated, to the assembly axis 50.

The lower end plate 24 facing the housing cover 16 is approximately annular. It has a coaxial pass-through opening 29 (cf. FIGS. 1, 2) for the connection nipple 300, 310. Radially between the pass-through opening 29 and the secondary separator element 28 of the filter insert 20, the lower end plate 24 is repeatedly bent, such that there is a circumferential annular trough 24a, which opens toward the element interior 21 of the filter insert 20. Said trough 24a can serve as a clean side collecting area 12 for collecting, under the influence of gravity, fluid being separated by the main separator element.

The radially inner edge of the lower end plate 24 surrounds the pass-through opening 29. It points toward the element interior 21.

The connecting part 300, 310 comprises a connecting element 300 and at least one clean gas conducting part 310. An inner diameter of the connecting element 300 is larger than an outer diameter of the clean gas conducting part 310. Between the radially outer peripheral wall of the clean gas conducting part 310 and the radially inner edge of the connecting element 300, an annular, coaxial fluid outlet 34, for example, a passage gap, remains for the oil separated by the main separator coalescing filter medium 23 and/or separated by the secondary separator element 28.

The interior of the connection nipple 300, 310 extends through the clean gas outlet 32 of the housing cover 16, thus co-defining the course of the clean gas (air) outlet opening 32 in the assembled state. The interior of the clean gas conducting part 310 forms or bounds the effective flow cross section of the clean gas outlet opening 32 of the housing cover 16.

The raw gas inlet 30 comprises at least two raw gas inlet holes 30 which pass through and which are arranged radially outside of an assembly opening 17 (cf. FIGS. 1 to 3) of the housing cover 16. Imaginary axes of the raw gas inlet holes 30 can extend, for example, parallel to the assembly axis 50.

In the flow path of the gas stream between the raw gas inlet 30 and the filter insert 20, more particularly between the housing cover 16 and the first end disc 24, at least one preliminary separator element 40 is arranged. The preliminary separator element 40 comprises, in particular consists of, at least one coalescing filter medium, comprising at least one coalescer material for removing oil from the gas stream.

The raw gas inlet 30 serves as an outlet for the oil being separated by the preliminary separator element 40.

The housing cover 16 is held on the housing corpus 18 by means of a retaining ring 52. The retaining ring 52 is connected by means of a flared connection 54 with the edge of the housing corpus 18.

The axial outside 25 of the lower end plate 24 bounded by the annular trough 24a extends over the main separator element filter medium 23 in the axial direction.

Figure 2:
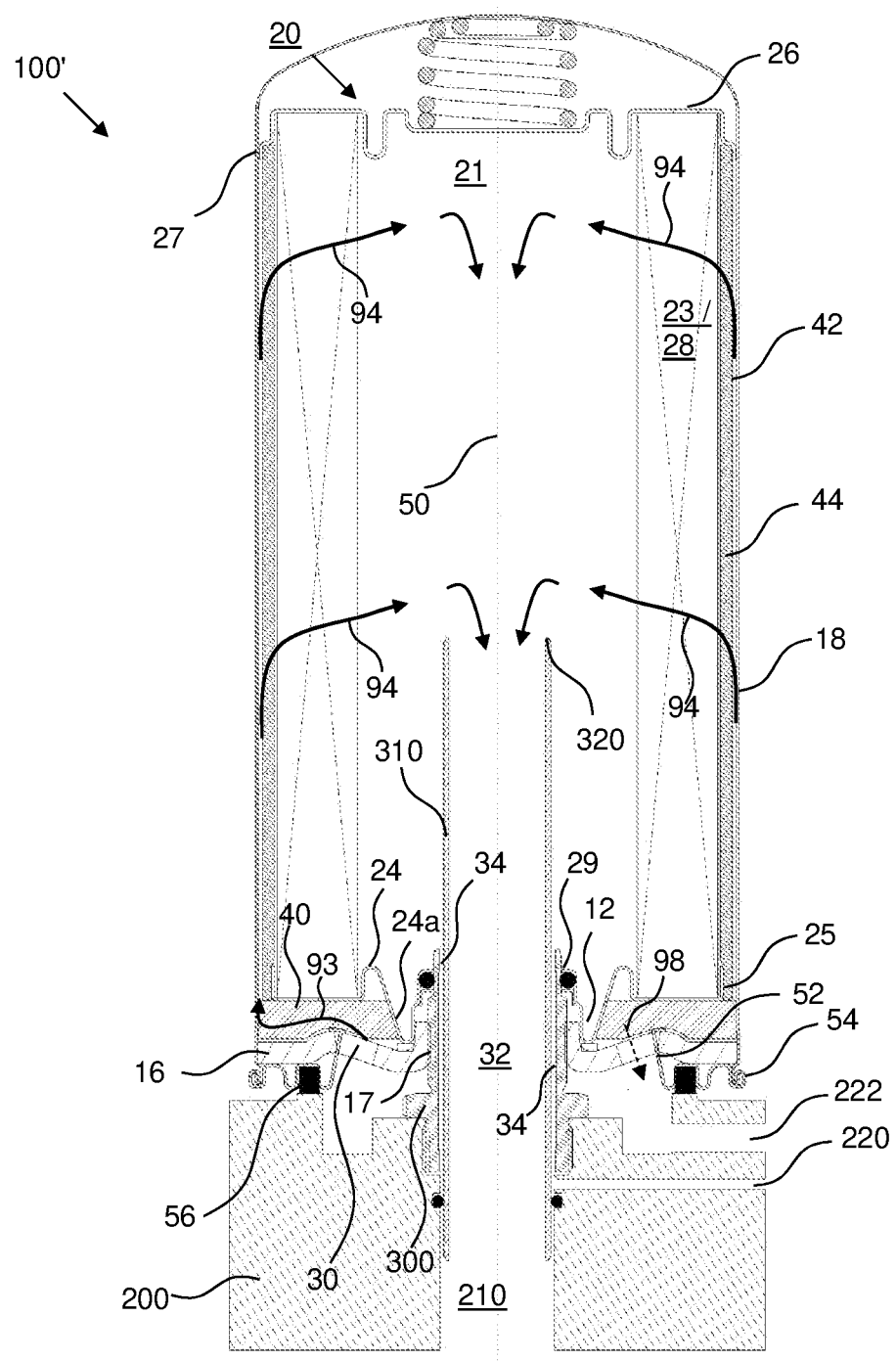
FIG. 2 shows a second exemplary embodiment of an oil separating air filter assembly comprising a separation device according to a second exemplary embodiment of the present invention, wherein the separation device is working according to the method of the present invention.

A bottoming of the annular trough-forming section 24a of the outside of the lower end plate 24 sits peripherally connected in the axial direction to a damping ring 56 (cf. FIGS. 1 and 2). The damping ring 56 is supported on the axially opposite side on an inner side of the housing cover 16. The damping ring 56 is coaxial with the assembly axis 50. It serves inter alia to reduce noise as a so-called rattle guard. It restricts the axial movability of the filter insert 20 in the housing 16, 18 and thus prevents rattling noises. The damping ring 56 can further serve as tolerance compensation and/or as damping for operational vibrations or oscillations.

The housing cover 16 is substantially circular. It is coaxial with the assembly axis 50. In its center, the housing cover 16 has a coaxial assembly opening 17 (cf. FIGS. 1 and 2) for the connection nipple 300, 310. A radially inner peripheral wall of the housing cover 16 surrounding the assembly opening 17 is equipped with an inner thread. The inner thread mates with a corresponding outer thread on the radially outer peripheral side of the connecting element 300 of the connection nipple 300, 310.

During operation of the separation device 100, 100', air, which can be loaded with oil droplets, flows from an air inlet line of the connector head 200 through the air inlet holes 30, indicated by an arrow 92 in FIG. 4, into an inlet chamber of the housing (16, 18). The lower part of the inlet chamber is located in the housing (16, 18) between the lower end plate 24 and the housing cover 16 and extends circumferentially radially outward about the filter insert 20.

The preliminary separator element 40 is arranged in the inlet chamber located in the housing (16, 18) between the lower end plate 24 and the housing cover 16.

The air flows through the preliminary separator element 40 from radially inward and axially downward to axially radially outward and axially upward, indicated by arrow 93 (cf. FIG. 1).

The oil droplets drain through the preliminary separator element 40, flow downward following gravity and leave the separation device 100, 100' through the raw gas inlet 30.

Figure 3:
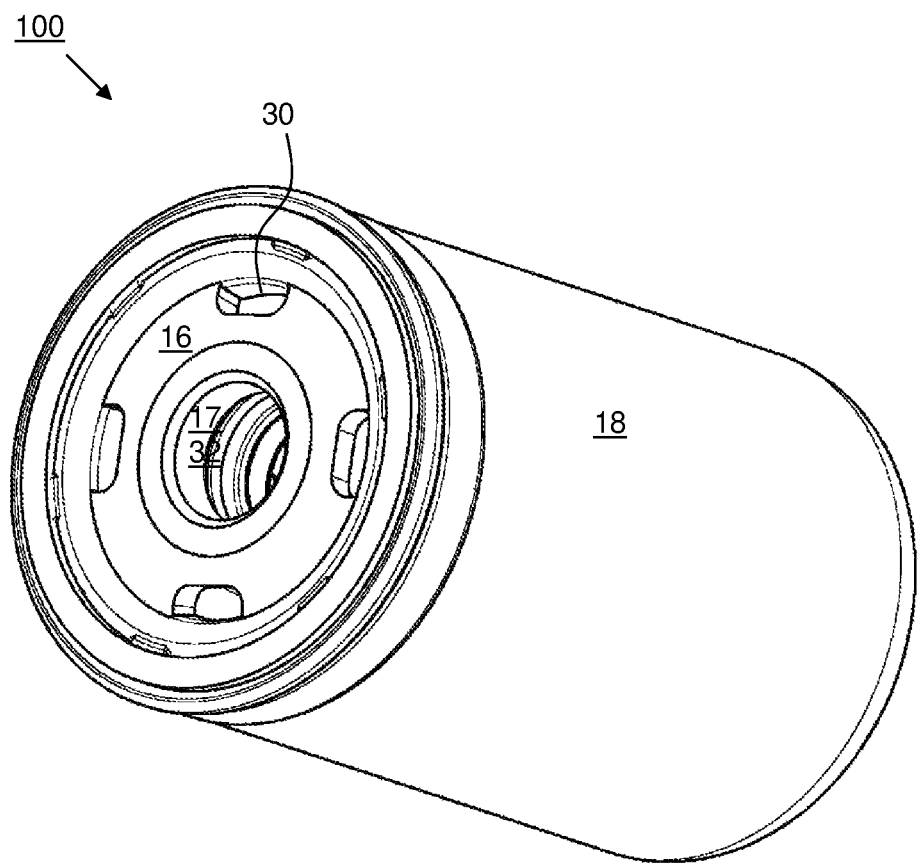
FIG. 3 shows an isometric view of the separation device of FIG. 1.

In the spin-on air de-oiling box 100 depicted in FIGS. 1 and 3, the pretreated air flows through the filter medium 23 of the main separator element as well as through the filter medium of the secondary separator element 28. Through the filter medium 23, 28 of the filter insert 20 the air flows from radially outward to radially inward, indicated by arrow 94 (cf. FIGS. 1 and 4). The oil droplets having been separated by the filter medium 23, 28 of the filter insert 20 flow downward following gravity and collect at the clean side collecting area 12.

The oil droplets collected in the clean side collecting area 12 pass through the coaxial fluid outlet 34 of the connection nipple 300, 310 and into the oil outlet channel 220 of the connector head 200. The separated oil droplets can flow, for example, to the oil outlet channel 220 of the connector head 200 via the coaxial fluid outlet 34 of the connection nipple 300 (cf. FIGS. 1 and 2) or the inner thread of the radially inner peripheral wall of the housing cover 16 surrounding the assembly opening 17 (not shown) or at least one oil outlet hole (not shown) of the housing cover 16.

The air, free of oil droplets, flows in the clean air side through the central air outlet opening 320 in the inner space of the nipple 310 out of the separation device 100, 100' and enters an air outlet channel 210 of the connector head 200.

The gas having been supplied to the oil separation device 100, 100' depicted in FIGS. 1 and 2 is guided within the housing 16, 18 of the separation device 100, 100' first through the preliminary separator element 40. Thus, the main separator element is supplied with pre-filtered gas. This leads to the advantage that the residual oil content of the clean air is highly decreased compared to oil separation devices without preliminary separator element.

The second embodiment of the separation device 100' according to the present invention (cf. FIG. 2) differs from the first embodiment of the separation device 100 according to the present invention (cf. FIGS. 1 and 3) only in that it additionally comprises a further preliminary separator element 44. This further preliminary separator element 44 is arranged concentrically to the main separator element and is assigned to the filter insert 20. For example, the coalescing filter medium of the further preliminary separator element 44 can be fixed, for example, be bounded, by the upper endplate 26. The preliminary separator element 40 is an independent component, namely a separate element being independent from the filter insert 20.

The further preliminary separator element 40 is disposed with regard to the axis 50 radially outward from the radially outer peripheral wall element 25 of the first end disc 24. This leads to the advantage that the oil droplets remain at the raw side, flow downward following gravity, drain through preliminary separator element 40, and leave the separation device 100' through the raw gas inlet 30.

FIG. 4 shows an oil separating air filter assembly 100'' according to prior art without preliminary separator element.

REFERENCE NUMBERS 12 clean side collecting area for collecting, under the influence of gravity, fluid being separated by the main separator element 23 and/or by the secondary separator element 28, wherein the clean side collecting area is arranged inside the housing 16, 18 at a geodetic lower area and is arranged at the clean side of the housing 16, 18
16 housing cover or lid, in particular threaded plate, for example, threaded cover plate
17 assembly opening of the housing cover 16
18 cup-shaped or cylindrical corpus or housing vessel of the housing of the separation device 100
20 hollow cylindrical filter insert
21 element interior of the filter insert 20
23 hollow cylindrical or ring-shaped coalescing filter medium of the main separator element, in particular made of glass fiber
24 first end disc or lower end plate of the cylindrical filter insert 20
24a annular trough of the first end disc 24
25 radially outer peripheral wall element of the first end disc 24 or axial outside of the first end disc 24
26 second end disc or upper end plate of the cylindrical filter insert 20
27 radially outer peripheral wall element of the second end disc 26
28 further filter medium of the filter insert 20, in particular secondary separator element
29 pass-through opening of the first end disc 24
30 raw gas inlet
32 clean gas outlet
34 fluid outlet for fluid being separated by the coalescing filter medium of the main separator element 23 and/or of the secondary separator element 28
40 preliminary separator element, in particular mat of fibers or fibrous nonwoven fabric, for example, made of polyester, the preliminary separator element being arranged in the flow path of the gas stream between the raw gas inlet 30 and the filter insert 20, in particular being arranged between the housing cover 16 and the first end disc 24
42 gap between the radial wall of the housing corpus 18 and the further preliminary separator element 44, in particular annular gap between housing corpus 18 and further preliminary separator element 44 (cf. FIG. 2)
44 further preliminary separator element, in particular hollow cylindrical or ring-shaped coalescing filter medium, for example, hollow cylindrical mat of fibers or fibrous nonwoven fabric, for example, made of polyester, the further preliminary separator element being arranged concentrically to the main separator element 23 (cf. FIG. 2)
50 axis, in particular an assembly axis, extending longitudinally through the housing corpus 18
52 retaining ring for holding the housing cover 16 on the housing corpus 18
54 flared connection
56 damping ring
92 gas inlet flow
93 gas flow through the preliminary separator element 40
94 gas flow through the filter insert 20
98 dashed arrow indicating separated oil droplets being separated by the preliminary separator element 40 and/or by the further preliminary separator element 44 passing through the raw gas inlet 30 (cf. FIGS. 1 to 3)
100 separation device of the first embodiment (cf. FIGS. 1 and 3), in particular spin-on separation device or spin-on filter or air de-oiling element or air/oil separator box or air/oil separator element, for separating fluid, in particular oil, from a gas stream, in particular from an air stream, for example, from a compressed air stream, of a connecting device
100' separation device of the second embodiment (cf. FIG. 2), in particular spin-on separation device or spin-on filter or air de-oiling element or air/oil separator box or air/oil separator element, for separating fluid, in particular oil, from a gas stream, in particular from an air stream, for example, from a compressed air stream, of a connecting device
100'' separation device according to prior art (cf. FIG. 4)
200 connector head of a connecting device, in particular of a compressor, a compressed air system or a vacuum pump
210 air outlet channel of the connector head
220 oil outlet channel of the connector head 200 for oil being separated by the filter medium 23 of the main separator element and/or by the secondary separator element 28, in particular first oil outlet channel of the connector head 200
222 raw gas inlet and oil outlet channel of the connector head 200 for oil being separated by the preliminary separator element 40 and optionally by the further preliminary separator element 44
222'' raw gas inlet of the connector head 200 of the separation device 100'' according to prior art
300 connecting element, in particular threaded pipe stub, for connecting the separation device 100, 100' with the connector head 200
310 clean gas conducting element, in particular nipple or tube, for conducting clean gas from the separation device 100; 100'; 100'' to the connector head 200 of the connecting device
320 central air outlet opening of the clean gas conducting element 310

What is claimed is:

1. A separation device for separating fluid from a gas stream deriving from a connecting device of a compressed air system or of a vacuum pump, the separation device comprising:
a housing configured to be replaceably connected to a connector head of the connecting device,
wherein the housing comprises
a cup-shaped housing corpus and
a housing cover covering a first axial end of the housing corpus, wherein the housing cover is non-detachably connected to the housing corpus,
wherein an axis extends longitudinally through the housing corpus and defines an axial direction;
a hollow cylindrical filter insert received in the housing in a flow path of the gas stream extending from
at least one raw gas inlet of the housing to at least one clean gas outlet of the housing,
wherein the hollow cylindrical filter insert comprises
at least one first end disc disposed at a first axial end face side of the hollow cylindrical filter insert and
further comprises at least one second end disc disposed at a second axial end face side of the hollow cylindrical filter insert,
wherein the at least one first end disc faces the housing cover and the at least one second end disc faces away from the housing cover;
wherein the hollow cylindrical filter insert further comprises
at least one main separator element comprising
at least one hollow cylindrical coalescing filter medium comprising at least one coalescer material configured to remove the fluid from the gas stream,
wherein the at least one hollow cylindrical coalescing filter medium of the at least one main separator element is configured to be flowed through radially by the gas stream;
a first preliminary separator element arranged in the flow path of the gas stream between the raw gas inlet and the hollow cylindrical filter insert,
wherein the first preliminary separator element comprises
at least one coalescing filter medium, comprising at least one coalescer material configured to remove the fluid from the gas stream,
wherein the first preliminary separator element is arranged between the housing cover and the at least one first end disc.

2. The separation device according to claim 1, wherein the first preliminary separator element is an independent component independent of the hollow cylindrical filter insert.

3. The separation device according to claim 1, wherein the first preliminary separator element is substantially disc-shaped and comprises at least one central or coaxial opening.

4. The separation device according to claim 1, wherein the at least one coalescer material of the preliminary separator element is a mat of fibers or a fibrous nonwoven fabric.

5. The separation device according to claim 4, wherein the mat of fibers or the fibrous nonwoven fabric is made of polyester.

6. The separation device according to claim 3, wherein the first preliminary separator element has an axial material thickness of at least 2 millimeter.

7. The separation device according to claim 1, wherein the first preliminary separator element essentially extends in a radial direction from a radial outer lateral surface of an area located between the at least one raw gas inlet and the hollow cylindrical filter insert to a radial inner lateral surface of the area located between the at least one raw gas inlet and the hollow cylindrical filter insert.

8. The separation device according to claim 1, wherein the first preliminary separator element essentially extends in a radial direction over a whole distance of a radial extension of an area located between the housing cover and the hollow cylindrical filter insert.

9. The separation device according to claim 1, wherein the first preliminary separator element essentially extends in a radial direction from the housing corpus to a radial inner lateral surface of the hollow cylindrical filter insert.

10. The separation device according to claim 1, wherein the first preliminary separator element essentially extends in a radial direction from the housing corpus to a radial inner lateral surface of the at least one first end disc.

11. The separation device according to claim 1, wherein the first preliminary separator element covers the at least one raw gas inlet.

12. An oil separating air filter assembly comprising:
a separation device according to claim 1;
at least one connecting part arranged within the at least one clean gas outlet of the separation device,
wherein the at least one connecting part comprises
at least one connecting element configured to connect the separation device with the connector head of the connecting device;
at least one clean gas conducting element comprising
at least one gas-conducting inner space configured to conduct clean gas from a clean side of the separation device to the connector head of the connecting device.

13. The oil separating air filter assembly according to claim 12, wherein
the at least one connecting element is a threaded pipe stub and
wherein the at least one clean gas conducting element is a nipple or a tube.

14. A separation device for separating fluid from a gas stream deriving from a connecting device of a compressed air system or of a vacuum pump, the separation device comprising:
a housing configured to be replaceably connected to a connector head of the connecting device,
wherein the housing comprises
a cup-shaped housing corpus and
a housing cover covering a first axial end of the housing corpus,
wherein the housing cover is non-detachably connected to the housing corpus,
wherein an axis extends longitudinally through the housing corpus and defines an axial direction;
a hollow cylindrical filter insert received in the housing in a flow path of the gas stream extending from
at least one raw gas inlet of the housing to at least one clean gas outlet of the housing,
wherein the hollow cylindrical filter insert comprises
at least one first end disc disposed at a first axial end face side of the hollow cylindrical filter insert and
further comprises at least one second end disc disposed at a second axial end face side of the hollow cylindrical filter insert,
wherein the at least one first end disc faces the housing cover and the at least one second end disc faces away from the housing cover;
wherein the hollow cylindrical filter insert further comprises
at least one main separator element comprising
at least one hollow cylindrical coalescing filter medium comprising at least one coalescer material configured to remove the fluid from the gas stream, wherein the at least one hollow cylindrical coalescing filter medium of the at least one main separator element is configured to be flowed through radially by the gas stream;
a first preliminary separator element arranged in the flow path of the gas stream between the raw gas inlet and the hollow cylindrical filter insert,
wherein the first preliminary separator element comprises
at least one coalescing filter medium, comprising at least one coalescer material configured to remove the fluid from the gas stream,
wherein the first preliminary separator element has a smaller flow resistance than the at least one coalescing filter medium of the at least one main separator element.

15. The separation device according to claim 14, wherein the at least one coalescer material of the first preliminary separator element has a smaller weight per unit area and/or a higher fiber coarseness than the at least one coalescing filter medium of the at least one main separator element.

16. The separation device according to claim 14, wherein the first preliminary separator element extends all the way from the housing cover to the at least one first end disc.

17. A separation device for separating fluid from a gas stream deriving from a connecting device of a compressed air system or of a vacuum pump, the separation device comprising:
a housing configured to be replaceably connected to a connector head of the connecting device,
wherein the housing comprises
a cup-shaped housing corpus and
a housing cover covering a first axial end of the housing corpus,
wherein the housing cover is non-detachably connected to the housing corpus,
wherein an axis extends longitudinally through the housing corpus and defines an axial direction;
a hollow cylindrical filter insert received in the housing in a flow path of the gas stream extending from
at least one raw gas inlet of the housing to at least one clean gas outlet of the housing,
wherein the hollow cylindrical filter insert comprises
at least one first end disc disposed at a first axial end face side of the hollow cylindrical filter insert and
further comprises at least one second end disc disposed at a second axial end face side of the hollow cylindrical filter insert,
wherein the at least one first end disc faces the housing cover and the at least one second end disc faces away from the housing cover;
wherein the hollow cylindrical filter insert further comprises
at least one main separator element comprising
at least one hollow cylindrical coalescing filter medium comprising at least one coalescer material configured to remove the fluid from the gas stream,
wherein the at least one hollow cylindrical coalescing filter medium of the at least one main separator element is configured to be flowed through radially by the gas stream;
a first preliminary separator element arranged in the flow path of the gas stream between the raw gas inlet and the hollow cylindrical filter insert,
wherein the first preliminary separator element comprises
at least one coalescing filter medium, comprising at least one coalescer material configured to remove the fluid from the gas stream,
wherein the first preliminary separator element has an axial material thickness of at least 2 millimeter,
wherein the first preliminary separator element essentially extends in the axial direction over a whole distance of an axial extension of an area between the housing cover and the hollow cylindrical filter insert.

18. A separation device for separating fluid from a gas stream deriving from a connecting device of a compressed air system or of a vacuum pump, the separation device comprising:
a housing configured to be replaceably connected to a connector head of the connecting device,
wherein the housing comprises
a cup-shaped housing corpus and
a housing cover covering a first axial end of the housing corpus,
wherein the housing cover is non-detachably connected to the housing corpus,
wherein an axis extends longitudinally through the housing corpus and defines an axial direction;
a hollow cylindrical filter insert received in the housing in a flow path of the gas stream extending from
at least one raw gas inlet of the housing to at least one clean gas outlet of the housing,
wherein the hollow cylindrical filter insert comprises
at least one first end disc disposed at a first axial end face side of the hollow cylindrical filter insert and
further comprises at least one second end disc disposed at a second axial end face side of the hollow cylindrical filter insert,
wherein the at least one first end disc faces the housing cover and the at least one second end disc faces away from the housing cover;
wherein the hollow cylindrical filter insert further comprises
at least one main separator element comprising
at least one hollow cylindrical coalescing filter medium comprising at least one coalescer material configured to remove the fluid from the gas stream,
wherein the at least one hollow cylindrical coalescing filter medium of the at least one main separator element is configured to be flowed through radially by the gas stream;
a first preliminary separator element arranged in the flow path of the gas stream between the raw gas inlet and the hollow cylindrical filter insert,
wherein the first preliminary separator element comprises
at least one coalescing filter medium, comprising at least one coalescer material configured to remove the fluid from the gas stream,
wherein the first preliminary separator element is held in position without any fastening member directly by geometries surrounding the first preliminary separator element,
wherein the geometries surrounding the first preliminary separator element are the housing cover, the housing corpus, and the at least one first end disc.

19. The separation device according to claim 16, wherein the at least one coalescing filter medium of the at least one main separator element is configured to separate the housing into a raw side, where the raw gas containing the fluid is located, and a clean side, where a clean gas having been cleaned from the fluid is located, and wherein the first preliminary separator element is arranged in the separation device such that the fluid separated by the first preliminary separator element flows by gravity through an opening arranged at the raw side of the housing out of the separation device.

20. The separation device according to claim 19, wherein the opening arranged at the raw side of the housing is the at least one raw gas inlet.

21. A separation device for separating fluid from a gas stream deriving from a connecting device of a compressed air system or of a vacuum pump, the separation device comprising:
- a housing configured to be replaceably connected to a connector head of the connecting device,
    - wherein the housing comprises
        - a cup-shaped housing corpus and
        - a housing cover covering a first axial end of the housing corpus,
            - wherein the housing cover is non-detachably connected to the housing corpus,
            - wherein an axis extends longitudinally through the housing corpus and defines an axial direction;
- a hollow cylindrical filter insert received in the housing in a flow path of the gas stream extending from
    - at least one raw gas inlet of the housing to at least one clean gas outlet of the housing,
    - wherein the hollow cylindrical filter insert comprises
        - at least one first end disc disposed at a first axial end face side of the hollow cylindrical filter insert and
        - further comprises at least one second end disc disposed at a second axial end face side of the hollow cylindrical filter insert,
        - wherein the at least one first end disc faces the housing cover and the at least one second end disc faces away from the housing cover;
    - wherein the hollow cylindrical filter insert further comprises
        - at least one main separator element comprising
            - at least one hollow cylindrical coalescing filter medium comprising at least one coalescer material configured to remove the fluid from the gas stream,
            - wherein the at least one hollow cylindrical coalescing filter medium of the at least one main separator element is configured to be flowed through radially by the gas stream;
- a first preliminary separator element arranged in the flow path of the gas stream between the raw gas inlet and the hollow cylindrical filter insert,
    - wherein the first preliminary separator element comprises
        - at least one coalescing filter medium, comprising at least one coalescer material configured to remove the fluid from the gas stream,
- further comprising
    - a second preliminary separator element, comprising
        - at least one coalescer material configured to remove the fluid from the gas stream,
        - wherein the second preliminary separator element is arranged concentrically to the at least one main separator element, and
        - wherein the second preliminary separator element and the at least one main separator element are arranged in succession in a direction of flow of the gas stream.

* * * * *